United States Patent
Matsumoto et al.

(10) Patent No.: US 9,823,335 B2
(45) Date of Patent: Nov. 21, 2017

(54) VEHICLE SYSTEM, IN-VEHICLE APPARATUS, AND PORTABLE DEVICE

(71) Applicants: DENSO CORPORATION, Kariya, Aichi-pref. (JP); NIPPON SOKEN, INC., Nishio, Aichi-pref. (JP)

(72) Inventors: Munenori Matsumoto, Kariya (JP); Kouji Sakamoto, Nagoya (JP)

(73) Assignees: DENSO CORPORATION, Kariya, Aichi-pref. (JP); SOKEN, INC., Nishio, Aichi-pref. (JP)

( * ) Notice: Subject to any disclaimer, the term of this patent is extended or adjusted under 35 U.S.C. 154(b) by 232 days.

(21) Appl. No.: 14/777,711

(22) PCT Filed: Feb. 12, 2014

(86) PCT No.: PCT/JP2014/000709
§ 371 (c)(1),
(2) Date: Sep. 16, 2015

(87) PCT Pub. No.: WO2014/147947
PCT Pub. Date: Sep. 25, 2014

(65) Prior Publication Data
US 2016/0154086 A1 Jun. 2, 2016

(30) Foreign Application Priority Data
Mar. 18, 2013 (JP) ................. 2013-055245

(51) Int. Cl.
*G01S 3/02* (2006.01)
*G01S 5/10* (2006.01)
(Continued)

(52) U.S. Cl.
CPC ............... *G01S 5/10* (2013.01); *B60R 25/24* (2013.01); *G01S 5/0226* (2013.01);
(Continued)

(58) Field of Classification Search
CPC ............ G01S 3/02; G01S 5/10; G01S 5/0226; B60R 25/24; G07C 9/00309
(Continued)

(56) References Cited

U.S. PATENT DOCUMENTS

2010/0139025 A1* 6/2010 Natsume ............... B60S 1/0896
15/250.31
2012/0293302 A1 11/2012 Matsumoto et al.

FOREIGN PATENT DOCUMENTS

JP 2004084406 A 3/2004
JP 3738981 B2 1/2006
(Continued)

OTHER PUBLICATIONS

International Search Report and Written Opinion (in Japanese with English Translation) for PCT/JP2014/000709, dated Apr. 15, 2014; ISA/JP.

*Primary Examiner* — Harry Liu
(74) *Attorney, Agent, or Firm* — Harness, Dickey & Pierce, P.L.C.

(57) ABSTRACT

A vehicle system includes: an in-vehicle apparatus having a signal transmission unit that transmits different pulse pattern signals from multiple transmitting antennas; and a portable device having a receiving unit that receives the signals. The in-vehicle apparatus or the portable device includes a portable device position identification unit that identifies a position of the portable device according to the signals. The portable device includes a frequency-to-voltage conversion unit that outputs a voltage corresponding to a frequency of each signal. The portable device position identification unit includes: a first storage unit that preliminary stores voltage change patterns corresponding to the frequencies of the signals in relation to positions of the vehicle; and a first position estimation unit that compares the voltage change patterns of the frequency-to-voltage conversion unit with the
(Continued)

voltage change patterns in the first storage unit, and estimates the position of the portable device.

11 Claims, 12 Drawing Sheets

(51) Int. Cl.
    *G07C 9/00*          (2006.01)
    *B60R 25/24*        (2013.01)
    *G01S 5/02*          (2010.01)
    *H04M 1/725*       (2006.01)

(52) U.S. Cl.
    CPC .................. *G07C 9/00309* (2013.01); *G07C 2009/00793* (2013.01); *G07C 2209/10* (2013.01); *G07C 2209/63* (2013.01); *H04M 1/72572* (2013.01)

(58) Field of Classification Search
    USPC ........................................................ 342/464
    See application file for complete search history.

(56) References Cited

FOREIGN PATENT DOCUMENTS

| | | |
|---|---|---|
| JP | 2012068102 A | 4/2012 |
| JP | 2012107377 A | 6/2012 |
| JP | 2012225147 A | 11/2012 |

\* cited by examiner

FIG. 3
| TRANSMITTING ANTENNA | D SEAT (ANTENNA A) | IN-TRUNK (ANTENNA C) | P SEAT (ANTENNA B) |
|---|---|---|---|
| TRANSMITTING FREQUENCY | 124kHz | 144kHz | 134kHz |
| | A<C<B |||
FIG. 4
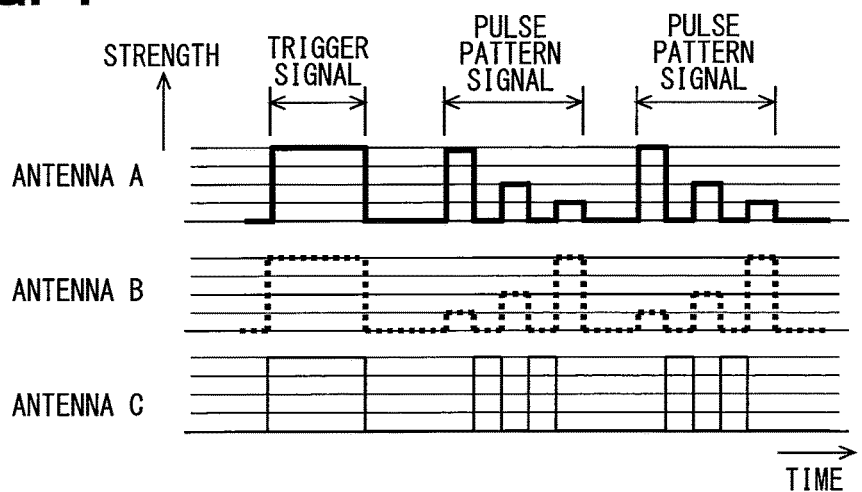
FIG. 5
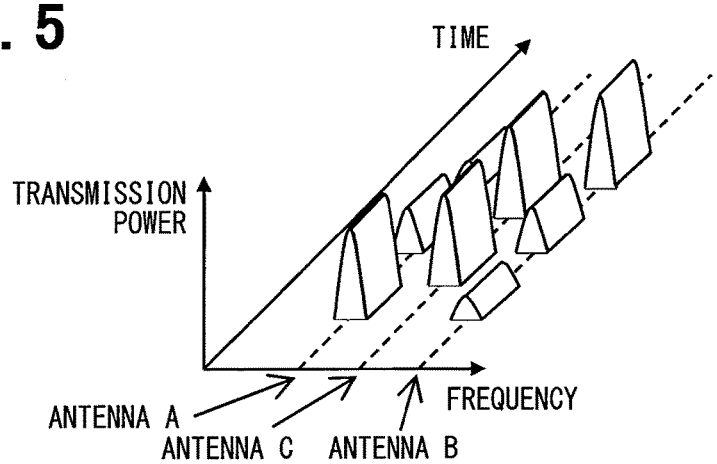

VOLTAGE CHANGE
PATTERN OF
RSSI VOLTAGE

VOLTAGE CHANGE
PATTERN OF
F-V CONVERSION
VOLTAGE

VOLTAGE CHANGE
PATTERN OF
RSSI VOLTAGE

VOLTAGE CHANGE
PATTERN OF
F-V CONVERSION
VOLTAGE

VEHICLE SYSTEM, IN-VEHICLE APPARATUS, AND PORTABLE DEVICE

CROSS REFERENCE TO RELATED APPLICATIONS

This application is a U.S. National Phase Application under 35 U.S.C. 371 of International Application No. PCT/JP2014/000709 filed on Feb. 12, 2014 and published in Japanese as WO 2014/147947 A1 on Sep. 25, 2014. This application is based on and claims the benefit of priority from Japanese Patent Application No. 2013-055245 filed on Mar. 18, 2013. The entire disclosures of all of the above applications are incorporated herein by reference.

TECHNICAL FIELD

The present disclosure relates to a vehicle system that receives radio waves transmitted from a portable device in response to radio waves transmitted from transmitting antennas installed on multiple places of a vehicle to identify a position of the portable device, and an in-vehicle apparatus and a portable device which configure the vehicle system.

BACKGROUND ART

Up to now, a technique has been known in which the position of the portable device is identified by receiving the radio waves transmitted from the portable device in response to the radio waves transmitted from the transmitting antennas installed on the multiple places of the vehicle. For example, Patent Literature 1 discloses that the position of the portable device relative to the vehicle is identified according to which of the transmitting antennas installed on the multiple locations of the vehicle the portable device responds to the radio waves transmitted from.

However, in the technique disclosed in Patent Literature 1, in order to improve a precision in the position identification of the portable device, there is a need to increase the number of transmitting antennas, and further finely implement the adjustment of output strengths of the respective transmitting antennas to prevent the outputs of the respective transmitting antennas from interfering with each other. This results in such problems that it is not easy to enhance the precision in the position identification of the portable device, and the costs increase.

PRIOR ART LITERATURES

Patent Literature

Patent Literature 1: JP-2004-84406 A

SUMMARY OF INVENTION

It is an object of the present disclosure to provide a vehicle system, an in-vehicle apparatus, and a portable device which are capable of more easily improving a precision in a position identification of the portable device while the costs are more suppressed.

According to a first aspect of the present disclosure, a vehicle system includes: an in-vehicle apparatus that is mounted in a vehicle; and a portable device that is carried by a user. The in-vehicle apparatus includes a pulse pattern signal transmission unit that transmits a plurality of pulse pattern signals at an overlapping timing, with strengths of radio waves changed according to patterns different from each other, from a plurality of transmitting antennas that are arranged at different positions of the vehicle, and have transmission frequencies set to be different from each other. The portable device includes a receiving unit that receives the radio waves transmitted from the plurality of transmitting antennas. At least one of the in-vehicle apparatus and the portable device further includes a portable device position identification unit that identifies a position of the portable device relative to the vehicle according to a received synthetic pattern of the pulse pattern signals received by the receiving unit. The portable device further includes a frequency-to-voltage conversion unit that outputs a plurality of voltages corresponding to frequencies of the pulse pattern signals transmitted from the plurality of transmitting antennas, which are received by the receiving unit at an overlapping timing. The portable device position identification unit includes: a first storage unit that preliminary stores a plurality of voltage change patterns of voltages corresponding to the frequencies of the pulse pattern signals transmitted from the plurality of transmitting antennas, which are received by the receiving unit at the overlapping timing, in relation to positions of the vehicle; and a first position estimation unit that compares the voltage change patterns of the voltages output from the frequency-to-voltage conversion unit with the voltage change patterns stored in the first storage unit, and estimates the position of the portable device relative to the vehicle. The portable device position identification unit identifies the position of the portable device relative to the vehicle based on an estimated result in the first position estimation unit.

When the pulse pattern signals with the strengths of the radio waves changed according to the patterns different from each other are received at the overlapping timing from the plurality of transmitting antennas that are arranged at the different positions of the vehicle, and have the transmit frequencies set to be different from each other, the pulse pattern signal in which those pulse pattern signals are synthesized together is received. The pulse pattern signals in the synthesized state are different in the degree of synthesis depending on the positions of the portable device relative to the plurality of transmitting antennas. Since the pulse pattern signals are different in the transmit frequencies depending on the transmitting antennas, frequency components also change depending on the positions of the portable device. Hence, the voltage change patterns of the voltages output from the frequency-to-voltage conversion unit also depend on the positions of the portable device. Therefore, the voltage change patterns of the voltages output from the frequency-to-voltage conversion unit are compared with the voltage change patterns stored in the first storage unit to estimate the position of the portable device relative to the vehicle, thereby being capable of identifying the position of the portable device with high precision.

Since the transmit frequencies of the respective transmitting antennas are different from each other, there is no need to finely implement the adjustment of output strengths of the respective transmitting antennas to prevent the outputs of the respective transmitting antennas from interfering with each other. Further, since the pulse pattern signals in the synthesized state change depending on the position of the portable device even if the number of transmitting antennas is small, the position of the portable device can be identified with high precision while an increase in the number of transmitting antennas is suppressed. This makes it possible to more easily improve the precision in the position identification of the portable device while the costs are more suppressed.

According to a second aspect of the present disclosure, an in-vehicle apparatus is used in the vehicle system according to the first aspect.

According to a third aspect of the present disclosure, a portable device is used in the vehicle system according to the first aspect.

Since the in-vehicle apparatus and the portable device described above are used for the vehicle system, the precision in the position identification of the portable device can be more easily improved while the costs are more suppressed.

BRIEF DESCRIPTION OF DRAWINGS

The above and other objects, features and advantages of the present disclosure will become more apparent from the following detailed description made with reference to the accompanying drawings. In the drawings:

FIG. 3 is a diagram illustrating an example of transmit frequencies of the respective antennas;

FIG. 4 is a diagram illustrating an example of signals transmitted from the respective antennas;

FIG. 5 is a diagram illustrating a relationship between frequencies and strengths of pulse pattern signals transmitted from the respective antennas;

EMBODIMENTS FOR CARRYING OUT INVENTION

Figure 1:
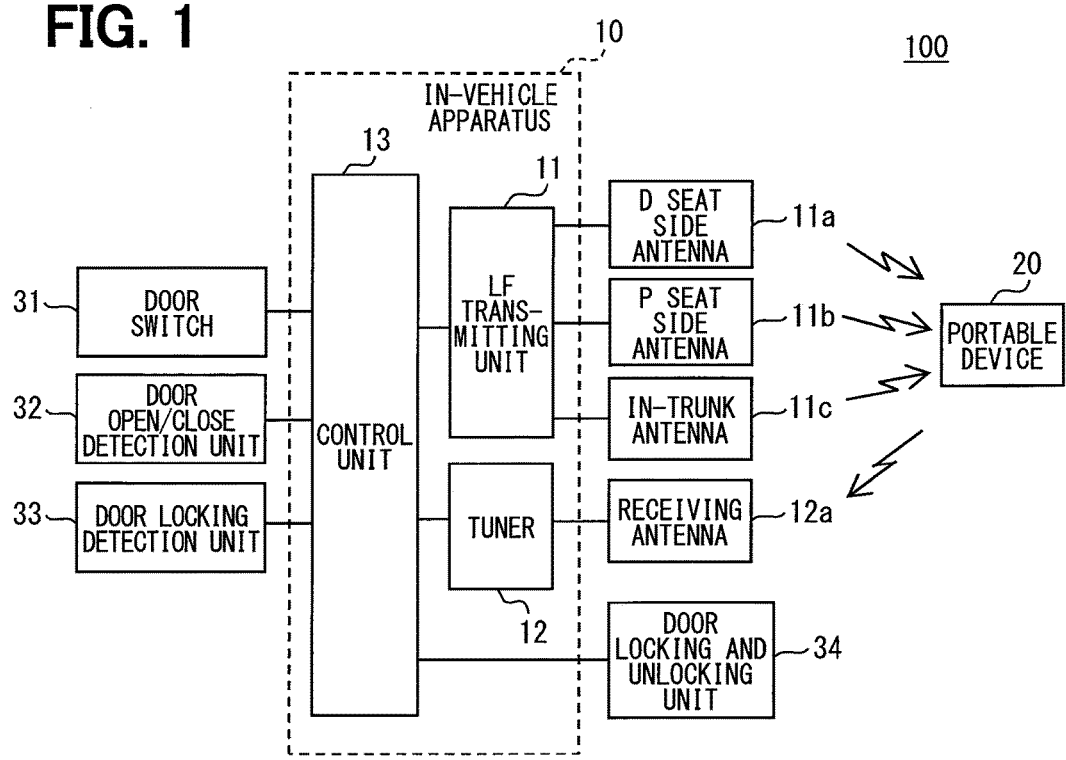
FIG. 1 is a block diagram illustrating an example of a schematic configuration of a vehicle system.

Hereinafter, embodiments of this disclosure will be described with reference to the accompanying drawings. In this embodiment, a vehicle system 100 is realized as one function of a smart entry system. FIG. 1 is a diagram illustrating an example of a schematic configuration of the vehicle system 100. The vehicle system 100 illustrated in FIG. 1 includes an in-vehicle apparatus 10 mounted on a vehicle, and a portable device 20.

The in-vehicle apparatus 10 transmits radio waves (request signal) for verification to the portable device 20, and receives radio waves (response signal) transmitted from the portable device 20 in response to the reception of the radio waves, to thereby verify the portable device 20 and also identify a position of the portable device 20. Then, the in-vehicle apparatus 10 performs a locking control and an unlocking control of doors of the vehicle according to the position of the portable device 20. As illustrated in FIG. 1, the in-vehicle apparatus 10 includes an LF transmission unit 11, a tuner 12, and a control unit 13.

Figure 2:
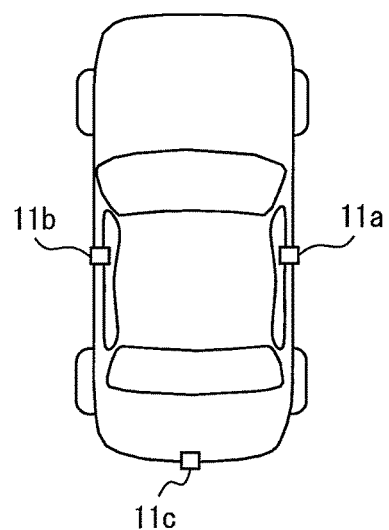
FIG. 2 is a block diagram illustrating respective antennas.

The LF transmission unit 11 is connected with a driver's seat (hereinafter called "D seat") antenna 11a, a passenger seat (hereinafter called "P seat") antenna 11b, and an in-trunk antenna 11c. As illustrated in FIG. 2, the D seat antenna 11a is arranged inside a center pillar present between a front seat and a rear seat on a driver's seat side, and the P seat antenna 11a is arranged inside a center pillar present between a front seat and a rear seat on a passenger's seat side. The in-trunk antenna 11c is arranged within a trunk room.

The LF transmission unit 11 generates a signal of an LF band according to the signal input from the control unit 13, and transmits radio waves corresponding to the generated signal from respective antennas 11a to 11c. The respective antennas 11a to 11c correspond to transmitting antennas.

The tuner 12 is connected with a receiving antenna 12a. The tuner 12 performs processing such as amplification or demodulation on the signal received by the receiving antenna 12a.

The control unit 13 is mainly configured by a microcomputer including a CPU, a ROM, a RAM, a backup RAM, and an I/O (all not shown), and executes various control programs stored in the ROM to execute various processes. The control unit 13 is connected with the LF transmission unit 11, the tuner 12, a door switch 31, a door open/close detection unit 32, a door locking detection unit 33, and a door locking and unlocking unit 34.

The door switch 31 is a touch switch installed in the vicinity of a door knob for opening and closing each door of the vehicle, or a touch switch installed in the vicinity of a door knob of a trunk door of the vehicle. A signal corresponding to the user's operation on the door switch 31 is output to the control unit 13.

The door open/close detection unit 32 is a switch for detecting an open/close state of the doors or the trunk door of the vehicle. A signal indicative of the open/close state of the doors or the trunk door of the vehicle is output to the control unit 13 from the door open/close detection unit 32.

The door locking detection unit 33 is a switch that detects the locking state of the doors and the trunk door of the vehicle. A signal indicative of the locking state of the doors and the trunk door of the vehicle is output from the door locking detection unit 33 to the control unit 13.

The door locking and unlocking unit 34 has actuators for locking or unlocking the doors and the trunk door of the vehicle, and drives the respective actuators, to thereby lock or unlock the doors and the trunk door of the vehicle.

Now, a description will be given of the transmit frequencies of the respective antennas 11a to 11c with reference to FIG. 3. In the vehicle system 100, the transmit frequencies of the respective antennas 11a to 11c are adjusted to be different from each other bit by bit. For example, the respective antennas 11a to 11c are each configured by a ferrite core antenna wide in the frequency band, and even if the transmit frequencies of the respective antennas 11a to 11c are different from each other, the output levels are the same as each other.

As illustrated in FIG. 3, the transmit frequency of the D seat antenna 11a is 124 kilohertz (kHz), the transmit frequency of the P seat antenna 11b is 144 kilohertz (kHz), and the transmit frequency of the in-trunk antenna 11c is 134 kilohertz (kHz). In other words, the transmit frequencies are set to be higher in the order of the D seat antenna 11a, the in-trunk antenna 11c, and the P seat antenna 11b.

Because the transmit frequencies of the respective antennas 11a to 11c are made different from each other to prevent the radio waves transmitted from the respective antennas 11a to 11c from interfering with each other as described above, even if the radio waves are transmitted from the respective antennas 11a to 11c at the same time, the radio waves do not interfere with each other. Hence, the portable device 20 can receive the radio waves from the respective antennas 11a to 11c at the overlapping timing.

In the vehicle system 100, the radio waves are transmitted from the respective antennas 11a to 11c so that not only the frequencies of the transmitting radio waves of the respective antennas 11a to 11c are made different from each other, but also the strengths of the radio waves are changed according to a predetermined pattern. The transmission of the radio waves from the respective antennas 11a to 11c with the strengths of the radio waves changed according to the predetermined pattern is performed by the LF transmission unit 11 according to an instruction from the control unit 13. Hence, the LF transmission unit 11 corresponds to the pulse pattern signal transmission unit.

As an example, as illustrated in FIG. 4, respective specific different pulse pattern signals are repetitively transmitted subsequent to trigger signals from the D seat antenna 11a (antenna A), the P seat antenna 11b (antenna B), and the in-trunk antenna 11c (antenna C).

The antenna A transmits the pulse pattern signal in such a manner that the transmission of the radio wave stops for a certain period of time after the strength of the radio wave is set to be high for a certain period of time, the transmission of the radio wave stops for the certain period of time after the strength of the radio wave is set to be medium for the certain period of time, and the transmission of the radio wave stops for the certain period of time after the strength of the radio wave is set to be low for the certain period of time.

Conversely, the antenna B transmits the pulse pattern signal in such a manner that the transmission of the radio wave stops for a certain period of time after the strength of the radio wave is set to be low for a certain period of time, the transmission of the radio wave stops for the certain period of time after the strength of the radio wave is set to be medium for the certain period of time, and the transmission of the radio wave stops for the certain period of time after the strength of the radio wave is set to be high for the certain period of time.

The antenna C transmits the pulse pattern signal in such a manner that the transmission of the radio wave stops for a certain period of time, the transmission of the radio wave stops after the strength of the radio wave is set to be high for a certain period of time, and the transmission of the radio wave stops for the certain period of time after the strength of the radio wave is again set to be high for the certain period of time.

A relationship between the frequencies and the strengths of the pulse pattern signals transmitted from the respective antennas 11a to 11c is illustrated in FIG. 5 as an example. As illustrated in FIG. 5, in the vehicle system 100, the radio waves of the different frequencies are transmitted from the respective antennas 11a to 11c so that the strengths of the radio waves change according to predetermined patterns.

In the vehicle system 100, the trigger signal is transmitted prior to the pulse pattern signal to suppress the variation in synchronizing the received signals. The details of the suppression of the variation in synchronizing the received signals with the use of the trigger signal will be described later. The transmission strength of the trigger signal may be set to a maximum level, and a signal of a pattern that is not generated when synchronizing the received signals is used as the trigger signal.

Subsequently, the portable device 20 will be described with reference to FIG. 6. The portable device 20 is carried by the user. The meaning of "carried by the user" described in the specification is not limited to a case in which the portable device 20 is actually carried by the user, but includes a case in which the portable device 20 can be carried, but is not actually carried by the user.

Figure 6:
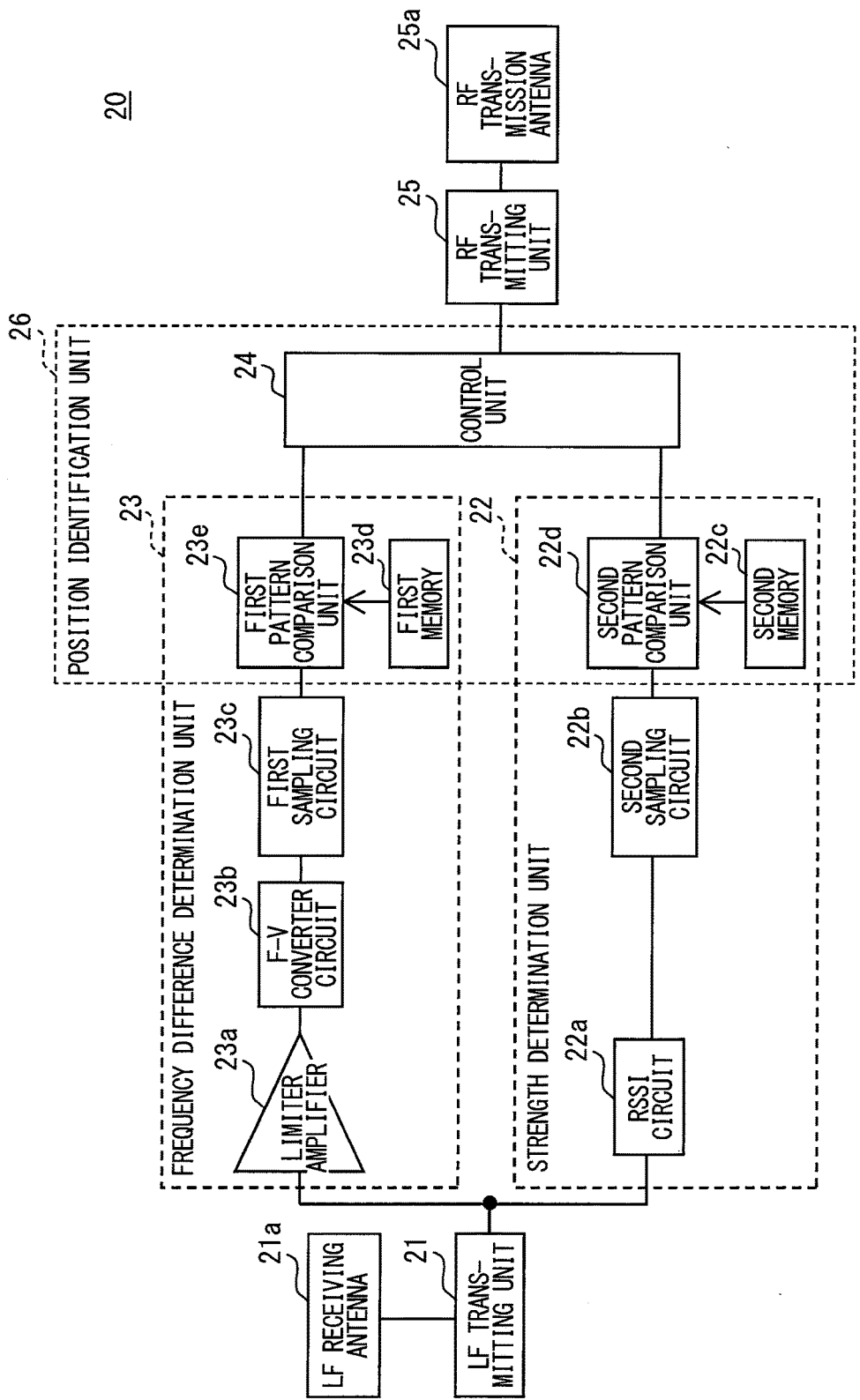
FIG. 6 is a block diagram illustrating an example of a schematic configuration of a portable device.

As illustrated in FIG. 6, the portable device 20 includes an LF receiving antenna 21a, an LF receiving unit 21, an strength determination unit 22, a frequency difference determination unit 23, a control unit 24, an RF transmission unit 25, and an RF transmission antenna 25a.

The LF receiving antenna 21a receives a radio wave of an LF band transmitted from the in-vehicle apparatus 10. The LF receiving antenna 21a is configured by a three-axis antenna of two horizontal directions (X-axis, Y-axis), and a vertical direction (Z-direction). The LF receiving unit 21 outputs a three-axis synthetic received signal input from the LF receiving antenna 21a to the strength determination unit 22 and the frequency difference determination unit 23. The LF receiving antenna 21a and the LF receiving unit 21 correspond to a receiving unit.

When the LF receiving antenna 21a receives signals from multiple antennas of the respective antennas 11a to 11c at an overlapping timing, the LF receiving unit 21 outputs a signal in which those signals are synthesized to the strength determination unit 22 and the frequency difference determination unit 23. The synthesis of the signals in the LF receiving unit 21 is performed by synchronizing the respective signals with rising of the above-mentioned trigger signals as a synchronization point. This suppresses the variation in synchronizing the received signals.

Figure 7A:
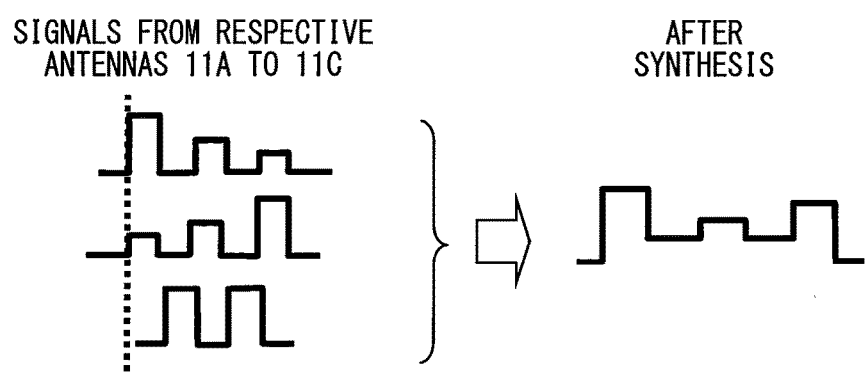
FIGS. 7A and 7B are diagrams illustrating a variation in synthesizing received signals when no trigger signal is used.
Figure 7B:
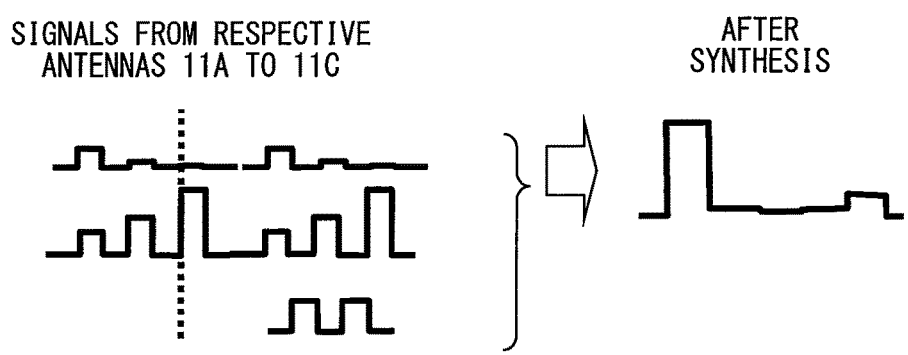

Hereinafter, a description will be given of the variation in synchronizing the received signals with reference to FIGS. 7A and 7B. FIGS. 7A and 7B illustrate examples of the synthesis of the received signals when no trigger signal is used. As illustrated in FIG. 7A, when received electric field strengths of the signals from the respective antennas 11a to 11c are sufficiently high, the synchronization points of the respective signals does not deviate from each other. However, as illustrated in FIG. 7B, when the received electric field strength of the signal from a part of the antennas is low, the synchronization points of the respective signals may deviate from each other, and the variation in synchronizing the received signals may occur. On the contrary, in this embodiment, the respective signals are synchronized by the trigger signals to suppress the variation in synchronizing the received signals.

Returning to FIG. 6, the strength determination unit 22 includes an RSSI circuit 22a, a second sampling circuit 22b, a second memory 22c, and a second pattern comparison unit 22d.

The RSSI circuit 22a is a circuit for detecting the received electric field strength of the signal received by the LF receiving unit 21. The RSSI circuit 22a outputs an RSSI voltage a level of which becomes higher as the received electric field strength of the signal received by the LF receiving unit 21 is higher. The RSSI circuit 22a corresponds to a signal strength output unit. The RSSI circuit 22a outputs the RSSI voltage corresponding to the received electric field strength of the received signal in spite of the frequency of the received signal.

The second sampling circuit 22b samples the RSSI voltage output from the RSSI circuit 22a at a predetermined sampling frequency to quantify and extract a voltage change pattern of the RSSI voltage. The voltage change pattern of the RSSI voltage becomes a received synthetic pattern in which the voltage change patterns of the RSSI voltages of the signals received by the LF receiving antenna 21a at the overlapping timing are synchronized.

The voltage change patterns of the RSSI voltages are stored in association with detection positions in the second memory 22c in advance. The voltage change patterns of the RSSI voltages are detected by the portable device 20 at respective portions of the vehicle interior and exterior of the vehicle where the respective antennas 11a to 11c are provided. The second memory 22c corresponds to a second storage unit. In this embodiment, it is assumed that the voltage change patterns of the RSSI voltages obtained by actually changing the positions of the portable device 20 relative to the vehicle on which the respective antennas 11a to 11c are installed are stored in the second memory 22c in advance.

Figure 8A:
FIGS. 8A to 8D are diagrams illustrating an example of voltage change patterns of an RSSI voltage obtained by the portable device at respective portions of vehicle interior and exterior.
Figure 8B:
Figure 8C:
Figure 8D:
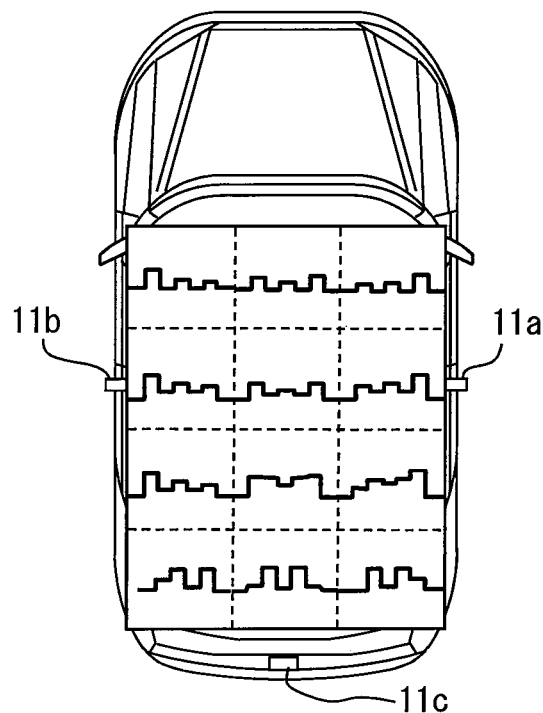

FIGS. 8A to 8D illustrate an example of the voltage change patterns of the RSSI voltages which are obtained by the portable device 20 in respective multiple areas into which the vehicle interior and exterior of the vehicle on which the respective antennas 11a to 11c are installed are partitioned. FIG. 8A illustrates the voltage change pattern by the antenna 11a in FIG. 8D, FIG. 8B illustrates the voltage change pattern by the antenna 11b in FIG. 8D, and FIG. 8C illustrates the voltage change pattern by the antenna 11c in FIG. 8D. FIG. 8D illustrates the voltage change patterns of the RSSI voltages in fifteen areas in total including twelve areas where the vehicle interior is partitioned into four areas in a longitudinal direction, and portioned into three areas in a lateral direction, and three areas where the vehicle exterior is portioned into a left side, a right side, and a backward. In this embodiment, an example in which the fifteen areas are associated with the voltage change patterns of the RSSI voltages, and stored in the second memory 22c will be described below.

As described above, the radio waves different in the transmitting frequency and the pulse pattern are transmitted from the respective antennas 11a to 11c. Hence, the radio waves transmitted from the respective antennas 11a to 11 are synthesized, and the voltage change pattern of the RSSI voltage extracted by the second sampling circuit 22b in the portable device 20 corresponds to the position of the portable device 20 in the vehicle interior and exterior. However, the voltage change patterns of the RSSI voltages tend to be similar to each other between the areas of the vehicle interior and exterior in the vicinity of door glasses.

The second pattern comparison unit 22d compares the voltage change pattern of the RSSI voltage extracted by the second sampling circuit 22b with the voltage change pattern of the RSSI voltage stored in the second memory 22c. Subsequently, the second pattern comparison unit 22d selects the voltage change pattern that matches the voltage change pattern extracted by the second sampling circuit 22b from the voltage change patterns stored in the second memory 22c. Then, the second pattern comparison unit 22d estimates the area associated with the selected voltage change pattern as the position of the portable device 20, and outputs information indicative of the position of the portable device 20 by digital data of multiple bits to the control unit 24. Hence, the second pattern comparison unit 22d corresponds to a second position estimation unit.

When the position of the portable device 20 cannot be determined such that the position of the portable device 20 cannot be uniquely identified, the second pattern comparison unit 22d outputs "undetermined information" of 1 bit indicating that the position of the portable device 20 is undetermined to the control unit 24. An example in which the position of the portable device 20 cannot be uniquely identified will be described below.

First, the example corresponds to a case in which the voltage change pattern that matches the voltage change pattern extracted by the second sampling circuit 22b is not stored in the second memory 22c. In addition, there is a case in which the multiple voltage change patterns that match the voltage change pattern extracted by the second sampling circuit 22b are stored in the second memory 22c. A situation in which the multiple voltage change patterns that match the voltage change pattern extracted by the second sampling circuit 22b are present can occur in a case where the portable device 20 is located in any one of the areas of the vehicle interior and exterior in the vicinity of the door glasses.

When the multiple voltage change patterns that match the voltage change pattern extracted by the second sampling circuit 22b are stored in the second memory 22c, the second pattern comparison unit 22d may be configured to estimate the respective areas associated with the plural matched voltage change patterns as the position of the portable device 20, and output information indicative of the estimated position and "undetermined information" to the control unit 24.

When the voltage change pattern that matches the voltage change pattern extracted by the second sampling circuit 22b is not stored in the second memory 22c, the second pattern comparison unit 22d may be configured to select the most similar voltage change pattern. In that case, the second pattern comparison unit 22d may be configured to estimate an area associated with the selected voltage change pattern as the position of the portable device 20, and output information indicative of the estimated position and "undetermined information" to the control unit 24.

Subsequently, the frequency difference determination unit 23 will be described. The frequency difference determination unit 23 includes a limiter amplifier 23a, a frequency-to-voltage converter circuit (hereinafter referred to as "F-V converter circuit") 23b, a first sampling circuit 23c, a first memory 23d, and a first pattern comparison unit 23e. A configuration including the first memory 23d, the first pattern comparison unit 23e, the second memory 22c, the second pattern comparison unit 22d, and the control unit 24 functions as a position identification unit 26. The position identification unit 26 corresponds to a portable device position identification unit.

The limiter amplifier 23a amplifies a signal input from the LF receiving unit 21, and outputs the amplified signal to the F-V converter circuit 23b. The F-V converter circuit 23b converts a frequency component included in the input signal into an F-V conversion voltage corresponding to the frequency component, and outputs the conversion voltage to the first pattern comparison unit 23e. The F-V converter circuit 23b corresponds to a frequency-to-voltage conversion unit. The F-V converter circuit 23b is a circuit in which an output voltage becomes higher as the frequency of the input signal is higher. The F-V converter circuit 23b is a circuit that outputs a voltage corresponding to a frequency difference of the signals different in frequency, which have been received by the LF receiving antenna 21a at the overlapping timing.

The first sampling circuit 23c samples the F-V conversion voltage output from the F-V converter circuit 23b at a predetermined sampling frequency to quantify and extract a voltage change pattern of the F-V conversion voltage. The voltage change pattern of the F-V conversion voltage becomes a received synthetic pattern in which the voltage change patterns of the F-V conversion voltages of the signals received by the LF receiving antenna 21a at the overlapping timing are synthesized.

The voltage change patterns of the F-V conversion voltages are stored in association with detection positions in the first memory 23d in advance. The voltage change patterns of the F-V conversion voltages are detected by the portable device 20 at respective portions of the vehicle interior and exterior of the vehicle where the respective antennas 11a to 11c are provided. The first memory 23d corresponds to a first storage unit. In this embodiment, it is assumed that the voltage change patterns of the F-V conversion voltages obtained by actually changing the positions of the portable device 20 relative to the vehicle on which the respective antennas 11a to 11c are installed are stored in the first memory 23d in advance. The first memory 23d and the second memory 22c may be memory regions of the same storage medium.

In this embodiment, an example in which fifteen areas in total are associated with the voltage change patterns of the F-V conversion voltages, and stored in the first memory 23d will be described below. The fifteen areas includes twelve areas where the vehicle interior is partitioned into four areas in a longitudinal direction, and portioned into three areas in a lateral direction, and three areas where the vehicle exterior is portioned into a left side, a right side, and a backward.

The first pattern comparison unit 23e compares the voltage change pattern of the F-V conversion voltage extracted by the first sampling circuit 23c with the voltage change pattern of the F-V conversion voltage stored in the first memory 23d. Subsequently, the first pattern comparison unit 23e selects the voltage change pattern that matches the voltage change pattern extracted by the first sampling circuit 23c from the voltage change patterns stored in the first memory 23d. Then, the first pattern comparison unit 23e estimates the area associated with the selected voltage change pattern as the position of the portable device 20, and outputs information indicative of the position of the portable device 20 by digital data of multiple bits to the control unit 24. Hence, the first pattern comparison unit 23e corresponds to a first position estimation unit.

When the position of the portable device 20 cannot be determined such that the position of the portable device 20 cannot be uniquely identified, the first pattern comparison unit 23e outputs "undetermined information" of 1 bit indicating that the position of the portable device 20 is undetermined to the control unit 24. An example in which the position of the portable device 20 cannot be uniquely identified will be described below.

When the multiple voltage change patterns that match the voltage change pattern extracted by the first sampling circuit 23c are stored in the first memory 23d, the first pattern comparison unit 23e may be configured to estimate the respective areas associated with the multiple matched voltage change patterns as the position of the portable device 20, and output information indicative of the estimated position and "undetermined information" to the control unit 24.

When the voltage change pattern that matches the voltage change pattern extracted by the first sampling circuit 23c is not stored in the first memory 23d, the first pattern comparison unit 23e may be configured to select the most similar voltage change pattern. In that case, the first pattern comparison unit 23e may be configured to estimate an area associated with the selected voltage change pattern as the position of the portable device 20, and output information indicative of the estimated position and "undetermined information" to the control unit 24.

As a matter of course, the voltage change patterns of the F-V conversion voltages and the voltage change patterns of the RSSI voltages are different from each other even if the areas in which the portable device 20 is located in the vehicle interior and exterior are the same as each other.

Figure 9A:
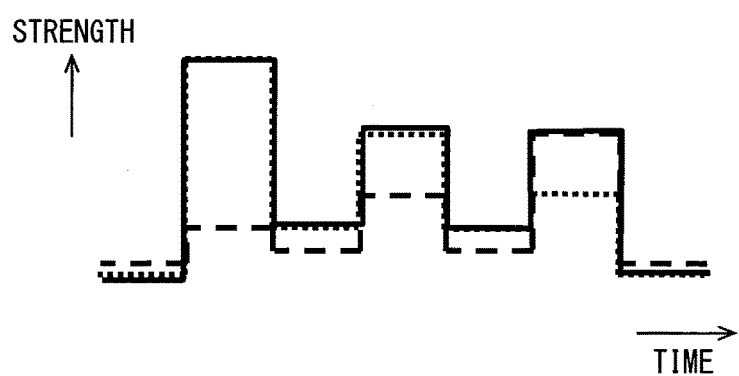
FIG. 9A is a diagram illustrating a received synthetic pattern of an RSSI voltage.
Figure 9B:
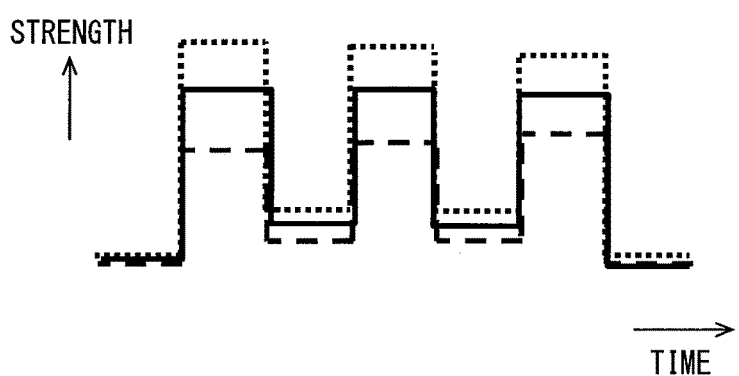
FIG. 9B is a diagram illustrating a received synthetic pattern of an F-V conversion voltage.

As exemplified in FIG. 9A, the voltage change pattern of the RSSI voltage becomes a received synthetic pattern which is configured by a maximum level of peaks of the voltage change patterns of the RSSI voltages in the pulse pattern signals from the respective antennas 11a to 11c. On the other hand, as exemplified in FIG. 9B, the voltage change pattern of the F-V conversion voltage becomes a received synthetic pattern which is configured by an average level of peaks of the voltage change patterns of the F-V conversion voltages in the pulse pattern signals from the respective antennas 11a to 11c. The peaks described in the present specification mean crest peaks and trough peaks. For convenience, FIGS. 9A and 9B illustrate a pattern (refer to dotted lines in FIGS. 9A and 9B) of the signal from the antenna 11a, and a pattern (refer to dashed lines in FIGS. 9A and 9B) of the signal from the antenna 11b. The synthesized received synthetic pattern is indicated by solid lines in FIGS. 9A and 9B.

The comparison of the voltage change patterns in the first pattern comparison unit 23e and the second pattern comparison unit 22d may be performed by subjecting the shape of the voltage change patterns to known pattern matching. However, in this embodiment, for the purpose of reducing a processing load, the voltage change patterns are classified to perform comparison according to the result of level determination of which of the levels classified into multiple stages values (levels) of the respective peak portions of crests and troughs of the voltage change pattern correspond to. Hereinafter, the crest peaks and the trough peaks of the voltage change patterns are called "points".

Figure 10A:
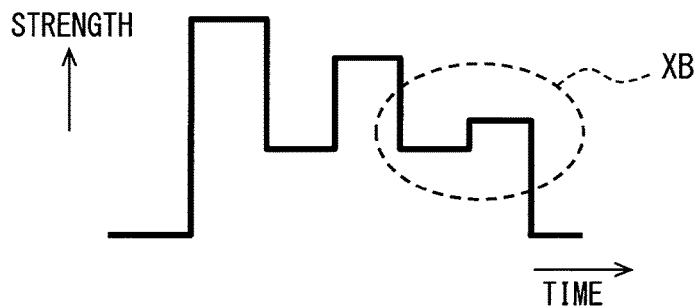
FIGS. 10A and 10B are diagrams illustrating a method for calculating a level of a point.
Figure 10B:
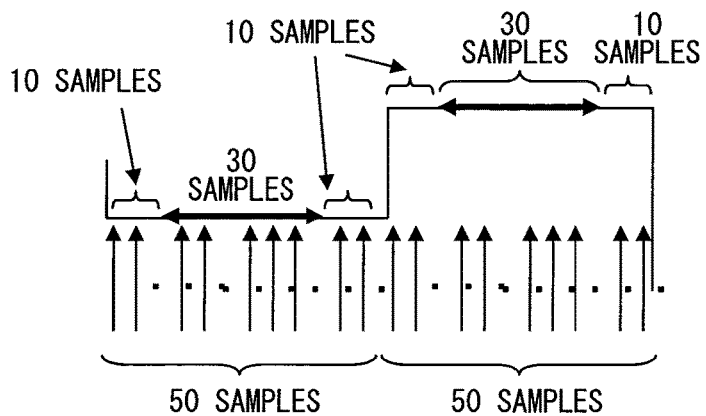

First, a method of calculating the levels of the respective points will be described. As the method of calculating the levels in the respective points, an average value of samples except for predetermined numbers of leading and trailing samples in each of the points is calculated as a value of the level in each point. The sample means a numeric value extracted by sampling. A specific example will be described below with reference to FIGS. 10A and 10B. FIG. 10B is an enlarged view of a portion XB in FIG. 10A. In FIGS. 10A and 10B, it is assumed that the respective points of the voltage change pattern have 50 samples, and the predetermined number is 10. In the example of FIGS. 10A and 10B, the average value of 30 samples except for respective 10 samples of the leading and trailing portions in each point is calculated as the value of the level in each point.

Subsequently, the level determination of each point in the voltage change pattern will be described. An example in which the points of the voltage change pattern are configured by 5 points of 1 to 5 in order from the leading portion, and the level determination of which of the levels classified into 5 stages according to the magnitude of the voltage the respective points correspond to is performed. The number of points and the number of classifications of the levels may be values other than those in this example.

Figure 11:
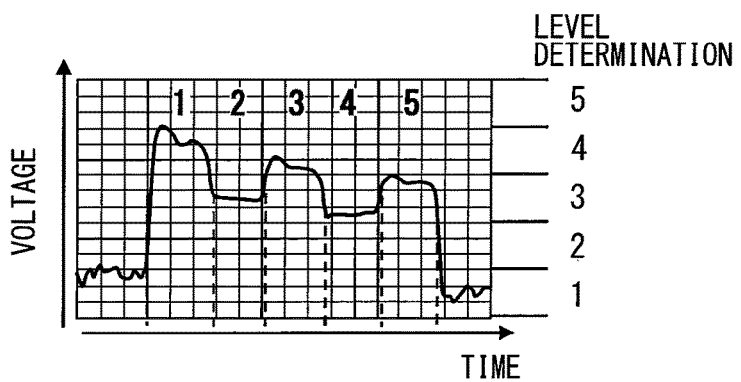
FIG. 11 is a diagram illustrating an example of level determination.

As an example, a configuration for performing the level determination of which of five stage levels in each point the level of the points calculated as described above corresponds to may be applied. For example, in an example of FIG. 11, the levels of the points are determined as 4, 3, 4, 3, and 3 in order from the leading portion. A string "43433" in which the determined levels of the points are arranged is dealt with as the voltage change pattern. The voltage change patterns stored in the first memory 23*d* and the second memory 22*c* are also stored as the string in which the determined levels of the points are arranged as described above.

According to the above configuration, since the comparison of the voltage change patterns can be performed by comparison of a relatively small number of strings, the processing load can be reduced as compared with a case in which the pattern matching of the respective shapes is performed.

In the level determination of the respective points of the voltage change pattern, which of the levels classified into the multiple stages each point corresponds to may be determined according to a variation of the level of the point relative to a previous point of the point to be subjected to the level determination except for a leading point of the multiple points in the voltage change pattern.

For the leading point, the above-mentioned level determination of which of the levels classified into five stages according to the magnitude of the voltage the leading point corresponds to may be performed. For the points except for the leading point, the variation of the level from one previous point may be calculated, and the level determination of which of the levels classified into the five stages according to the magnitude of the variation each point corresponds to may be performed. Then, the string in which the determined levels of the points are arranged may be dealt with as the voltage change pattern.

Figure 12A:
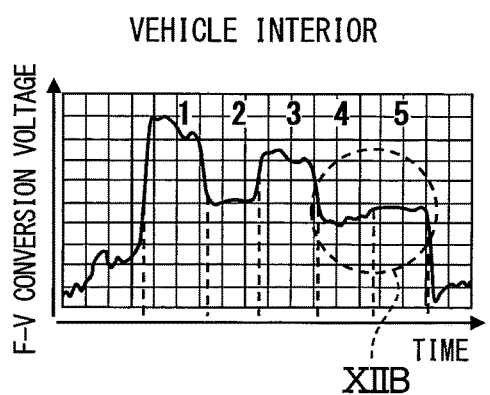
FIGS. 12A to 12D are diagrams illustrating other examples of the level determination.
Figure 12C:
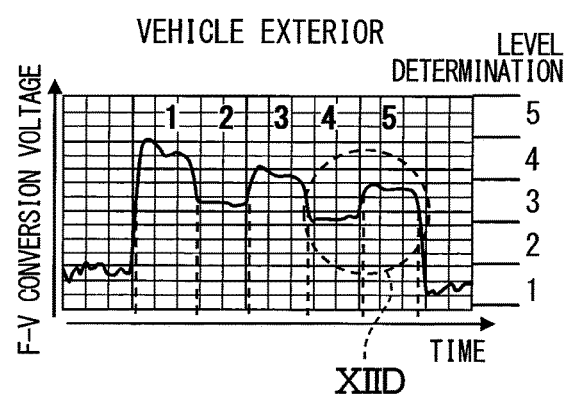
Figure 12B:
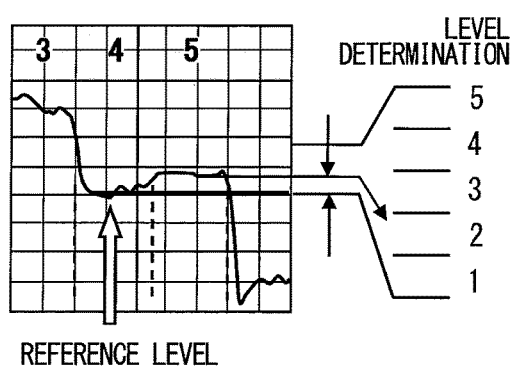
Figure 12D:
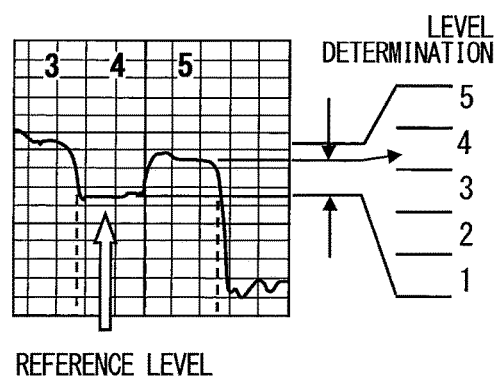

According to the above configuration, in the level determination of the respective points, as compared with the configuration where the level determination of which of the levels classified into the multiple stages each point corresponds to is performed, even if the classification of the levels is not subdivided, the voltage change patterns can be classified with higher precision. Therefore, a precision in the matching determination when comparing the voltage change patterns can be improved while the processing load is reduced, as a result of which a precision in the position identification of the portable device 20 can be improved. The operational effects will be described with reference to FIGS. 12A to 12D. FIG. 12B illustrates an enlarged view of a portion XIIB in FIG. 12A, and FIG. 12D illustrates an enlarged view of a portion XIID in FIG. 12C.

FIGS. 12A to 12D exemplify the voltage change patterns of the F-V conversion voltage when the portable device 20 is located in the respective areas of the vehicle interior and exterior in the vicinity of the door glasses. Hereinafter, those voltage change patterns are called "voltage change pattern of the vehicle interior", and "voltage change pattern of the vehicle exterior". As illustrated in FIGS. 12A to 12D, the voltage change pattern of the vehicle interior and the voltage change pattern of the vehicle exterior are identical in the level of the points 1 to 4 with each other, and different in only the level of the point 5 from each other. However, in the levels classified into the five stages according to the magnitude of the voltages, both of those voltage change patterns become "3", and cannot be classified.

On the contrary, according to the configuration for classifying the levels into the five stages depending on the magnitude of the variation in the level from one previous point, as illustrated in FIGS. 12A to 12D, the levels of those voltage change patterns are determined as different levels, and can be classified. Specifically, the point 5 of the voltage change pattern of the vehicle interior is determined as the level "2", and the point 5 of the voltage change pattern of the vehicle exterior is determined as the level "4".

Figure 13:
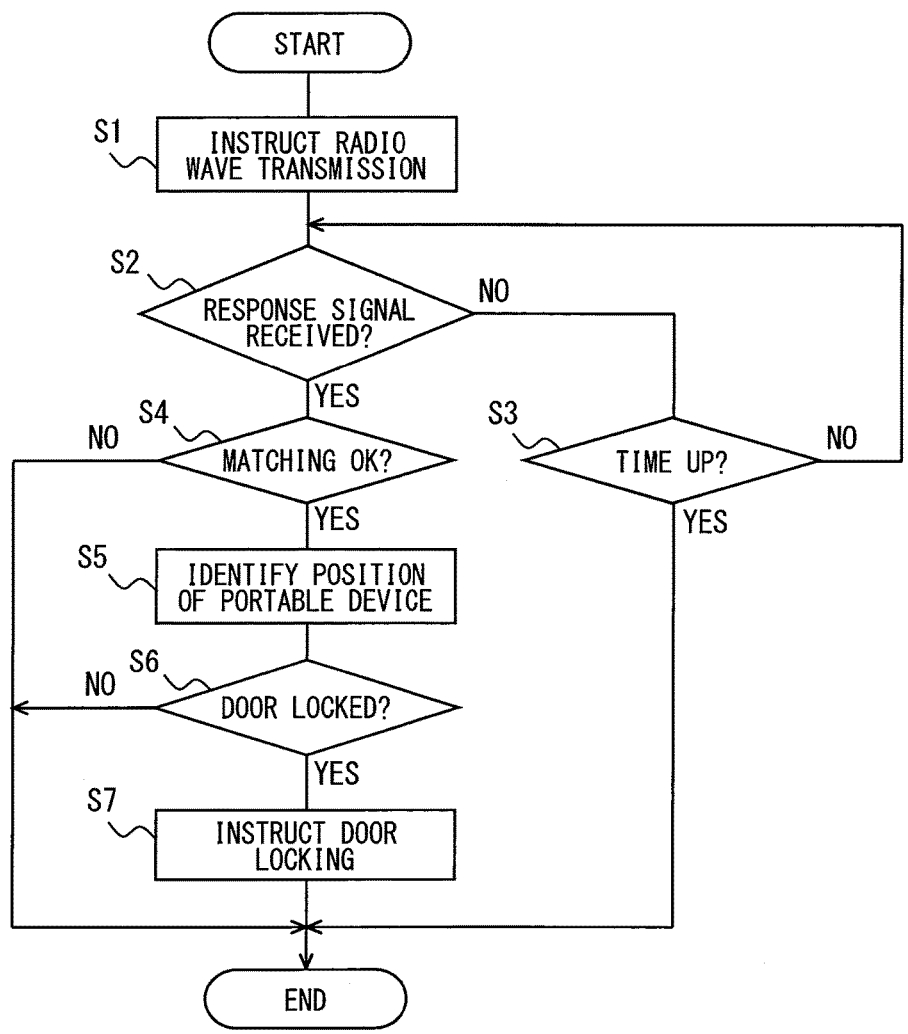
FIG. 13 is a flowchart illustrating an example of a flow of processing associated with position identification of the portable device by a control unit of the in-vehicle apparatus.

Subsequently, a process associated with the position identification of the portable device 20 in the control unit 13 of the in-vehicle apparatus 10 will be described with reference to FIG. 13. A flowchart of FIG. 13 may start when a user operates the door switch 31, and a signal corresponding to the user operation is input from the door switch 31.

First, the transmission of radio waves from the respective antennas 11*a* to 11*c* is instructed in Step S1, and the flow proceeds to Step S2. As an example, the LF transmission unit 11 is instructed to transmit the trigger signals, the pulse pattern signals illustrated in FIG. 4, and data including identification information on the portable device 20 from the respective antennas 11*a* to 11*c*. With the above operation, the pulse pattern signals having the strength of the radio waves changed according to the patterns different from each other as illustrated in FIG. 4 are transmitted at the overlapping timing. In addition, the data including the identification information on the portable device 20 is transmitted. The control unit 13 puts into a reception wait state of a response signal after the radio wave transmission has been instructed.

In Step S2, when the response signal is received through the receiving antenna 12*a* and the tuner 12 (yes in Step S2), the flow proceeds to Step S4. On the other hand, when the response signal is not received (no in Step S2), the flow proceeds to Step S3.

In Step S3, when an elapsed time after the radio wave transmission has been instructed in Step S1 reaches a predetermined time (yes in Step S3), the flow is terminated as time up. On the other hand, when the elapsed time after the radio wave transmission has been instructed in Step S1 does not reach the predetermined time (no in Step S3), the flow returns to Step S2, and the flow is repeated. The elapsed time after the radio wave transmission has been instructed in Step S1 may be counted by a timer circuit not shown. The predetermined time may be arbitrarily set.

In Step S4, it is determined whether matching is OK, or not. For example, whether matching is OK, or not, may be determined depending on whether the identification information included in the response signal matches the identification information included in data transmitted in Step S1, or not. If it is determined that matching is OK (yes in Step S4), the flow proceeds to Step S5. On the other hand, if it is determined that matching is not OK (no in Step S4), the flow is terminated.

In Step S5, the position of the portable device 20 relative to the vehicle is identified, and the flow proceeds to Step S6. The position of the portable device 20 relative to the vehicle is identified according to portable device position information, which will be described later, included in the response signal.

In Step S6, it is determined whether the doors are locked, or not. In this embodiment, it is assumed that when the position of the portable device 20 is outside the vehicle, the door lock is implemented, and when the position of the portable device 20 is inside the vehicle, the door lock is not implemented. When the position of the portable device 20 identified in Step S5 is outside the vehicle, it is determined that the doors are locked (yes in Step S6), and the flow proceeds to S7. On the other hand, when the position of the portable device 20 identified in Step S5 is inside the vehicle, it is determined that the doors are not locked (no in Step S6), and the flow is terminated.

In Step S7, the door locking and unlocking unit 34 is instructed to lock the doors, and the flow is terminated. The door locking and unlocking unit 34 drives an actuator for locking the doors and the trunk door of the vehicle in response to the instruction of the door lock, and locks the doors of the vehicle.

Figure 14:
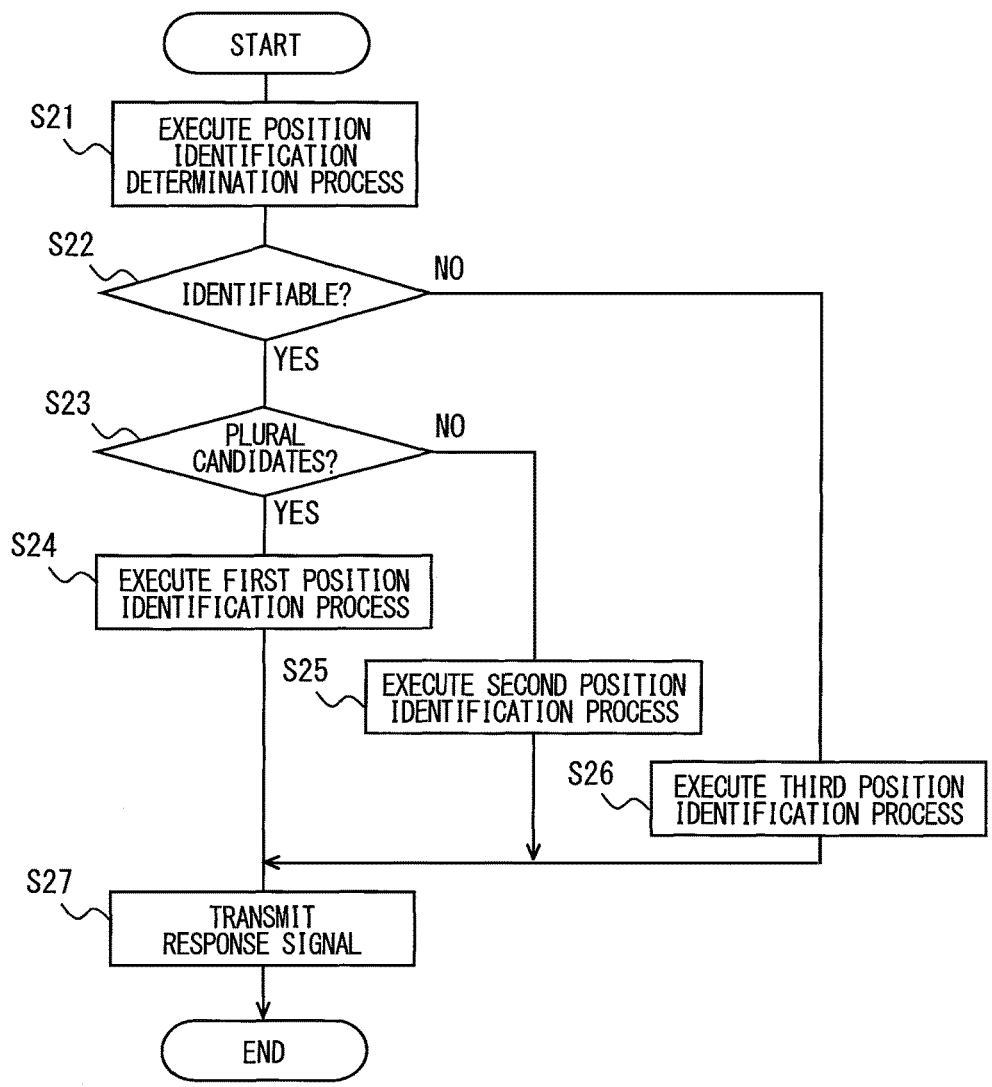
FIG. 14 is a flowchart illustrating an example of a flow of processing associated with the position identification of the portable device by a control unit of the portable device.

Subsequently, a process associated with the position identification of the portable device 20 in the control unit 24 of the portable device 20 will be described with reference to FIG. 14. A flowchart of FIG. 14 may start when radio waves of an LF band transmitted from the in-vehicle apparatus 10 are received by the LF receiving antenna 21a, and a request signal is input from the LF receiving unit 21.

First, a position identification determination process is conducted in Step S21, and the flow proceeds to Step S22. In the position identification determination process, it is determined whether the position of the portable device 20 can be identified from information (hereinafter referred to as "portable device positional information") indicative of the position of the portable device 20, which is input from the strength determination unit 22, or not. As an example, when the undetermined information described above is input in addition to the portable device positional information, it is determined that the position of the portable device 20 cannot be identified. On the other hand, when the portable device positional information is input, but the above-mentioned undetermined information is not input, it is determined that the position of the portable device 20 can be identified.

When it is determined in the position identification determination process that the position of the portable device 20 can be identified in Step S22 (yes in Step S22), the flow proceeds to Step S26. On the other hand, when it is determined in the position identification determination process that the position of the portable device 20 cannot be identified in Step S22 (no in Step S22), the flow proceeds to Step S23.

When the portable device positional information input from the strength determination unit 22 is portable device positional information on plural areas, and multiple candidates are present in Step S23 (yes in Step S23), the flow proceeds to Step S24. On the other hand, when the number of candidates is not plural (no in Step S23), the flow proceeds to Step S25.

A first position identification process is performed in Step S24, and the flow proceeds to Step S27. In the first position identification process, the position of the portable device 20 is identified from the multiple candidates with the use of the portable device positional information input from the frequency difference determination unit 23. In detail, the same area as an estimated result in the frequency difference determination unit 23 is selected from the multiple candidates, and the selected area is identified as the position of the portable device 20.

For example, when the portable device positional information indicative of "D seat rear, vehicle interior" and "D seat rear, vehicle exterior" is input from the strength determination unit 22, and the portable device positional information indicative of "D seat rear, vehicle exterior" is input from the frequency difference determination unit 23, "D seat rear, vehicle exterior" that is the same as the estimated result of the frequency difference determination unit 23 is identified as the position of the portable device 20.

In Step S25 when the number of candidates is not plural, the second position identification process is performed, and the flow proceeds to Step S27. In the second position identification process, the position of the portable device 20 is identified with the use of the portable device positional information input from the frequency difference determination unit 23. As an example, when the portable device positional information is input from the frequency difference determination unit 23, but the above-mentioned undetermined information is not input, the area indicated by the portable device positional information is identified as the position of the portable device 20.

When the undetermined information is input from the frequency difference determination unit 23 in addition to the portable device positional information, the area indicated by the portable device positional information input from the strength determination unit 22 may be identified as the position of the portable device 20, or the area indicated by the portable device positional information input from the frequency difference determination unit 23 may be identified as the position of the portable device 20.

In Step S26 when it is determined in a first position identification determination process that the position of the portable device 20 can be identified, a third position identification process is performed, and the flow proceeds to Step S27. In the third position identification process, the position of the portable device 20 is identified with the use of the portable device positional information input from the strength determination unit 22.

In Step S27, a response signal including the position of the portable device 20 identified in a previous step and identification information on a subject device is transmitted to the in-vehicle apparatus 10 through the RF transmission unit 25 and the RF transmission antenna 25a, and the flow is terminated. When the previous step is Step S24, the position of the portable device 20 identified in Step S24 is transmitted. When the previous step is Step S25, the position of the portable device 20 identified in Step S25 is transmitted, and when the previous step is Step S26, the position of the portable device 20 identified in Step S26 is transmitted.

According to the configuration of this embodiment, since the transmit frequencies of the respective antennas 11a to 11c are made different from each other, there is no need to finely implement the adjustment of the output strengths of the respective antennas 11a to 11c to prevent the respective outputs from interfering with each other. Further, since the pulse pattern signals in the synthesized state change depending on the position of the portable device 20 even if the number of transmitting antennas for transmitting the pulse pattern signals is small, the position identification of the portable device 20 can be performed with high precision while an increase in the number of transmitting antennas is suppressed. For example, the position identification of the portable device 20 can be performed with sufficiently high precision if three transmitting antennas such as the antennas 11a to 11c are provided.

According to the configuration of this embodiment, the position of the portable device 20 is identified taking into consideration not only the position of the portable device 20 estimated with the use of the voltage change patterns of the RSSI voltages, but also the position of the portable device 20 estimated with the use of the voltage change patterns of the F-V conversion voltages. As a result, the position of the portable device 20 can be identified with higher precision. Now, the operational effects will be described in detail with reference to FIGS. 15A to 15C. DI in FIG. 15A indicates a position corresponding to "D seat rear, vehicle interior", and DO indicates a position corresponding to "D seat rear, vehicle exterior". FIG. 15B illustrates the voltage change patterns at the position of DI in FIG. 15A, and FIG. 15C illustrates the voltage change patterns at the position of DO in FIG. 15A.

Figure 15A:
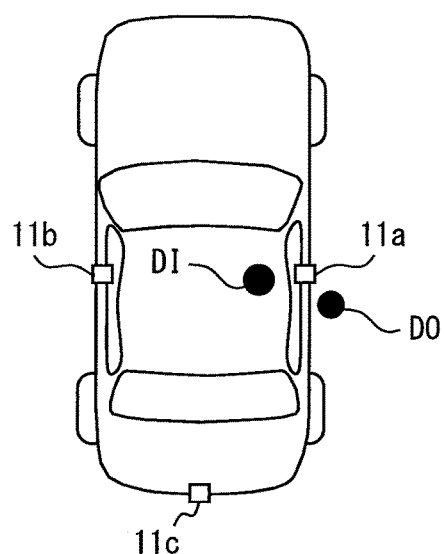
FIGS. 15A to 15C are diagrams illustrating operational effects of the present disclosure.
Figure 15B:
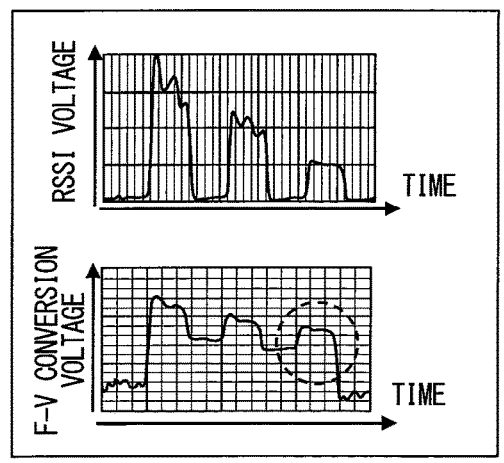
Figure 15C:
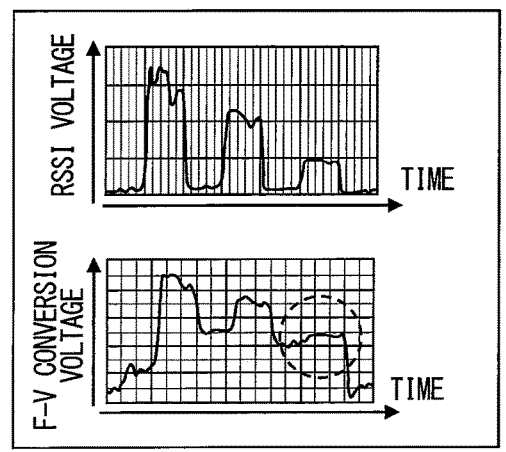

As illustrated in FIGS. 15A to 15C, the voltage change patterns of the RSSI voltages may be similar to each other between the areas of the vehicle interior and exterior in the vicinity of door glasses. In that case, even if the voltage change patterns of the RSSI voltages are used, the portable device 20 cannot identify any one of "D seat rear, vehicle interior" and "D seat rear, vehicle exterior". On the contrary, the voltage change pattern of the F-V conversion voltage produces a sufficient difference between the areas inside and outside the vehicle in the vicinity of the door glasses (refer to dashed circles in FIGS. 15B to 15C). This makes it possible to identify the position of the portable device 20 which cannot be identified by only the voltage change patterns of the RSSI voltages with the use of the voltage change patterns of the F-V conversion voltages.

As the above results, according to the configuration of this embodiment, the precision in the position identification of the portable device can be more easily improved while the costs are more suppressed.

In the above-mentioned embodiment, the example in which the door locking and unlocking unit 34 is instructed according to the position of the portable device 20, and the locking of the doors of the vehicle is implemented has been described, but the present disclosure is not always limited to this configuration. For example, the present disclosure can be applied to the unlocking of the doors of the vehicle, or start permission of an engine of the vehicle.

In the above-mentioned embodiment, the example in which the radio waves different in the frequency and the pulse pattern are transmitted from the respective antennas 11a to 11c has been described. However, the number of antennas, the positions of the antennas, and transmit frequencies, and the pulse patterns are not limited to the above-mentioned example.

Figure 16A:
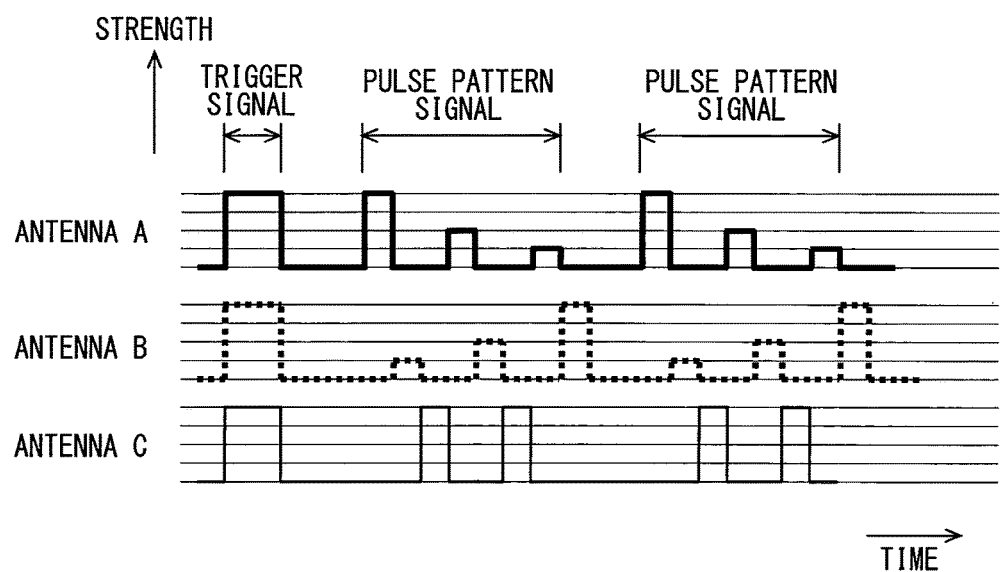
FIGS. 16A and 16B are diagrams illustrating other examples of signals transmitted from the respective antennas.
Figure 16B:
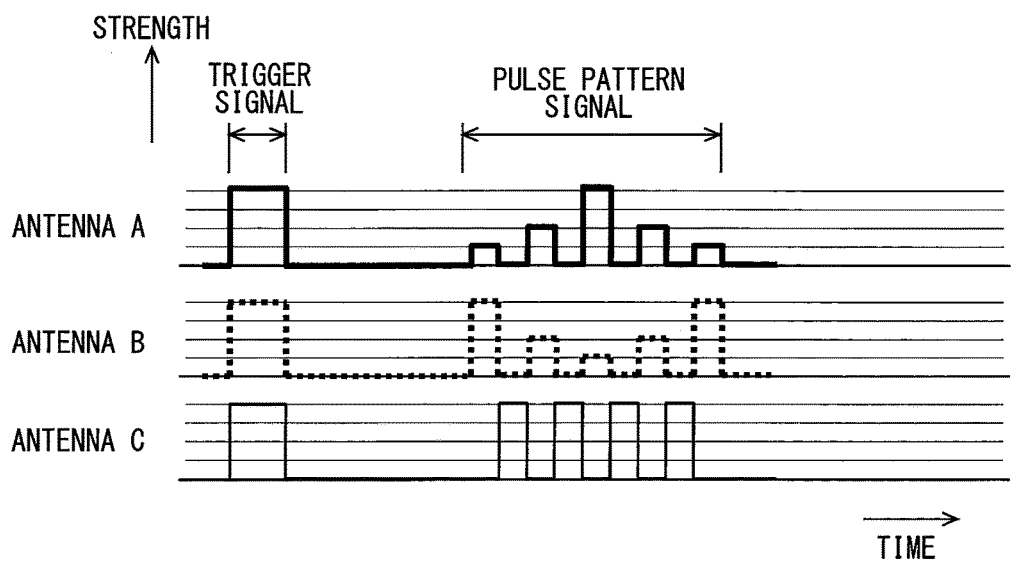

For example, as the pulse pattern, a pulse pattern in which the respective crest peaks of the pulse pattern signals of the respective antennas 11a to 11c do not overlap with each other may be provided as illustrated in FIG. 16A. In addition, the present disclosure is not limited to the example in which the pulse pattern signals of a three-stage variable or a two-stage variable are transmitted as described above, but pulse pattern signals of five-stage variable or four-stage variable may be transmitted as illustrated in FIG. 16B.

The portable device 20 in the above embodiment includes the strength determination unit 22 and the frequency difference determination unit 23, and is configured to identify the position of the portable device 20 taking both of the position of the portable device 20 estimated by the strength determination unit 22 and the position of the portable device 20 estimated by the frequency difference determination unit 23 into consideration. However, the present disclosure is not always limited to the above configuration. For example, the position of the portable device 20 estimated by the frequency difference determination unit 23 with no provision of the strength determination unit 22 may be identified as the position of the portable device 20.

In addition, the function of the position identification unit 26 may be provided by the control unit 13 of the in-vehicle apparatus 10 instead of the portable device 20. In that case, the portable device 20 may be configured to transmit the voltage change patterns of the F-V conversion voltage extracted by the first sampling circuit 23c and the voltage change patterns of the RSSI voltage extracted by the second sampling circuit 22b to the in-vehicle apparatus 10. The in-vehicle apparatus 10 may be configured to perform the position identification of the portable device 20 by the control unit 13 from the voltage change patterns of the F-V conversion voltage and the voltage change patterns of the RSSI voltage which are received from the portable device 20. Hence, the control unit 13 also corresponds to the portable device position identification unit.

It is noted that a flowchart or the processing of the flowchart in the present application includes sections (also referred to as steps), each of which is represented, for instance, as S1. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A vehicle system comprising:
an in-vehicle apparatus that is mounted in a vehicle; and
a portable device that is carried by a user, wherein:
the in-vehicle apparatus includes a pulse pattern signal transmission unit that transmits a plurality of pulse pattern signals at an overlapping timing, with strengths of radio waves changed according to patterns different from each other, from a plurality of transmitting antennas that are arranged at different positions of the vehicle, and have transmission frequencies set to be different from each other;
the portable device includes a receiving unit that receives the radio waves transmitted from the plurality of transmitting antennas;
at least one of the in-vehicle apparatus and the portable device further includes a portable device position identification unit that identifies a position of the portable device relative to the vehicle according to a received synthetic pattern of the pulse pattern signals received by the receiving unit;
the portable device further includes a frequency-to-voltage conversion unit that outputs a plurality of voltages corresponding to frequencies of the pulse pattern signals transmitted from the plurality of transmitting antennas, which are received by the receiving unit at an overlapping timing;
the portable device position identification unit includes:
a first storage unit that preliminary stores a plurality of voltage change patterns of voltages corresponding to the frequencies of the pulse pattern signals transmitted from the plurality of transmitting antennas, which are received by the receiving unit at the overlapping timing, in relation to positions of the vehicle; and
a first position estimation unit that compares the voltage change patterns of the voltages output from the frequency-to-voltage conversion unit with the voltage change patterns stored in the first storage unit, and estimates the position of the portable device relative to the vehicle; and the portable device position identification unit identifies the position of the portable device relative to the vehicle based on an estimated result in the first position estimation unit.

2. The vehicle system according to claim 1, wherein:

the portable device further includes a signal strength output unit that outputs a plurality of voltages corresponding to strengths of the pulse pattern signals transmitted from the plurality of transmitting antennas, which are received by the receiving unit at the overlapping timing;

the portable device position identification unit further includes:

a second storage unit that preliminary stores a plurality of voltage change patterns of the voltages corresponding to the strengths of the pulse pattern signals transmitted from the plurality of transmitting antennas, which are received by the receiving unit at the overlapping timing, in relation to positions of the vehicle; and a second position estimation unit that compares the voltage change patterns of the voltages output from the signal strength output unit with the voltage change patterns stored in the second storage unit, and estimates the position of the portable device relative to the vehicle; and the portable device position identification unit identifies the position of the portable device relative to the vehicle according to the position of the portable device which is estimated by the first position estimation unit, and the position of the portable device which is estimated by the second position estimation unit.

3. The vehicle system according to claim 2, wherein:

the portable device position identification unit identifies which area the portable device is located in when an inside and an outside of a compartment of the vehicle is divided to a plurality of areas; and when the area in which the portable device is located is not uniquely identified according to an estimated result in the second position estimation unit, the portable device position identification unit uniquely identifies the area in which the portable device is located according to an estimated result of the first position estimation unit.

4. The vehicle system according to claim 1, wherein:

the first position estimation unit classifies and compares each voltage change pattern according to a result of level determination to which stage a value of each peak portion of a top and a bottom in each of the voltage change patterns output from the frequency-to-voltage conversion unit and the voltage change patterns stored in the first storage unit is disposed when a level is classified into a plurality of stages.

5. The vehicle system according to claim 4, wherein:

in the level determination, the first position estimation unit determines to which stage the value of each peak portion is disposed when the level is classified into the plurality of stages, according to a variation in the value of each peak portion relative to a temporally previous peak portion as a standard of the peak portion, to which the level determination is performed, except for a leading peak portion of the plurality of peak portions in each voltage change pattern.

6. The vehicle system according to claim 4, wherein:

each of the voltage change patterns output from the frequency-to-voltage conversion unit and the voltage change patterns stored in the first storage unit includes a plurality of samples which are data elements of the voltage change patterns; and the first position estimation unit sets an average value of the samples except for predetermined numbers of samples in a leading part and an ending part in the peak portion to be the value of the peak portion, in the level determination of each peak portion of the respective voltage change pattern.

7. The vehicle system according to claim 2, wherein:

the second position estimation unit classifies and compares each voltage change pattern according to the result of level determination to which stage a value of each peak portion of a top and a bottom in each of the voltage change patterns output from the signal strength output portion unit and the voltage change patterns stored in the second storage unit is disposed when a level is classified into a plurality of stages.

8. The vehicle system according to claim 7, wherein:

in the level determination, the second position estimation unit determines to which stage the value of each peak portion is disposed when the level is classified into the plurality of stages, according to a variation in the value of each peak portion relative to a temporally previous peak portion as a standard of the peak portion, to which the level determination is performed, except for a leading peak portion of the plurality of peak portions in each voltage change pattern.

9. The vehicle system according to claim 7, wherein:

each of the voltage change patterns output from the signal strength output unit and the voltage change patterns stored in the second storage unit includes a plurality of samples which are data elements of the voltage change patterns, and the second position estimation unit sets an average value of the samples except for predetermined numbers of samples in a leading part and an ending part in the peak portion to be the value of the peak portion, in the level determination of each peak portion of the respective voltage change pattern.

10. An in-vehicle apparatus used in the vehicle system according to claim 1.

11. A portable device used in the vehicle system according to claim 1.

* * * * *